United States Patent
Geskes et al.

(10) Patent No.: US 11,342,610 B2
(45) Date of Patent: May 24, 2022

(54) ACCUMULATOR ARRANGEMENT

(71) Applicant: Mahle International GmbH, Stuttgart (DE)

(72) Inventors: Peter Geskes, Ostfildern (DE); Thomas Kalmbach, Stuttgart (DE); Andre Loges, Leonberg (DE); Michael Moser, Ellwangen (DE); Joachim Treier, Oppenau (DE); Georg Votteler, Backnang (DE); Mario Wallisch, Aichtal (DE)

(73) Assignee: Mahle International GmbH

( * ) Notice: Subject to any disclaimer, the term of this patent is extended or adjusted under 35 U.S.C. 154(b) by 188 days.

(21) Appl. No.: 16/662,013

(22) Filed: Oct. 23, 2019

(65) Prior Publication Data

US 2020/0136213 A1 Apr. 30, 2020

(30) Foreign Application Priority Data

Oct. 24, 2018 (DE) ..................... 10 2018 218 216.7

(51) Int. Cl.
*H01M 10/6556* (2014.01)
*H01M 10/625* (2014.01)
(Continued)

(52) U.S. Cl.
CPC ......... *H01M 10/6556* (2015.04); *B60L 50/64* (2019.02); *H01M 10/625* (2015.04); *H01M 50/20* (2021.01); *H01M 50/209* (2021.01); *H01M 50/224* (2021.01); *H01M 50/249* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 9,859,593 B2 | 1/2018 | Herntier et al. | |
| 2006/0093899 A1* | 5/2006 | Jeon | H01M 50/20 429/99 |

(Continued)

FOREIGN PATENT DOCUMENTS

| | | |
|---|---|---|
| DE | 10 2015 108 611 A1 | 12/2016 |
| DE | 10 2015 115 875 A1 | 3/2017 |

OTHER PUBLICATIONS

English abstract for DE-10 2015 115 875.

*Primary Examiner* — Gregg Cantelmo
(74) *Attorney, Agent, or Firm* — Fishman Stewart PLLC (57) ABSTRACT

An accumulator arrangement for a hybrid or electric vehicle may include a plurality of battery cells stacked in a stacking direction to form at least one battery block, and a housing including a support frame limiting the housing towards an outside on four sides. The support frame may include at least two longitudinal members and at least two cross members perpendicularly aligned with one another. At least one longitudinal member of the at least two longitudinal members may be configured to conduct a coolant. The at least one battery block may abut against at least one of (i) the at least one longitudinal member and (ii) at least one of the at least two cross members to transfer heat. A plurality of connection points of the at least one longitudinal member, through which the coolant is flowable, may be configured on an outside of the support frame.

20 Claims, 5 Drawing Sheets

(51) Int. Cl.
  *B60L 50/64* (2019.01)
  *H01M 50/20* (2021.01)
  *H01M 50/224* (2021.01)
  *H01M 50/249* (2021.01)
  *H01M 50/209* (2021.01)

(56) References Cited

U.S. PATENT DOCUMENTS

| | | | |
|---|---|---|---|
| 2009/0208829 A1* | 8/2009 | Howard | F28D 15/0233 |
| | | | 429/120 |
| 2012/0009455 A1 | 1/2012 | Yoon | |
| 2012/0244404 A1* | 9/2012 | Obasih | H01M 10/6551 |
| | | | 429/99 |
| 2012/0298433 A1* | 11/2012 | Ohkura | H01M 10/6555 |
| | | | 180/65.1 |
| 2014/0342195 A1* | 11/2014 | Bhola | H01M 10/6555 |
| | | | 429/50 |
| 2015/0104686 A1* | 4/2015 | Brommer | H01M 10/647 |
| | | | 429/99 |
| 2016/0156074 A1* | 6/2016 | Mascianica | H01M 10/647 |
| | | | 429/50 |
| 2016/0344061 A1* | 11/2016 | Maguire | H01M 10/613 |
| 2018/0026243 A1 | 1/2018 | Stojanovic et al. | |
| 2018/0154754 A1 | 6/2018 | Rowley et al. | |

* cited by examiner

ACCUMULATOR ARRANGEMENT

CROSS-REFERENCE TO RELATED APPLICATIONS

This application claims priority to German Patent Application No. DE 10 2018 218 216.7, filed on Oct. 24, 2018, the contents of which are hereby incorporated by reference in its entirety.

TECHNICAL FIELD

The invention relates to an accumulator arrangement for a hybrid or electric vehicle.

BACKGROUND

Hybrid and electric vehicles are becoming more and more important. A hybrid or electric vehicle is thereby permanently or temporarily driven by electrical energy from an accumulator arrangement, which is charged or discharged during operation of the hybrid or electric vehicle. The accumulator arrangement thereby usually comprises a plurality of battery blocks—so-called battery modules—of a plurality of battery cells, which are arranged in a housing. Generally speaking, more and more battery cells are combined to form a battery block. In response to the charging and the discharging, the accumulator arrangement heats up, which is unwanted. For instance, a Li-ion battery cell must not heat up permanently to above a temperature of 40-50° C., for example, because the service life of the Li-ion battery cells is significantly reduced otherwise.

In order to cool the accumulator arrangement, cooling plates are usually attached to the battery blocks. The cooling plates can thereby be in contact with L-shaped cooling elements made of aluminum so as to transfer heat—for example via a heat-conducting paste. The individual cooling elements are then arranged between the individual battery cells of the accumulator arrangement and from there guide the heat generated in the battery cells to the cooling plates. The cooling plates are usually made of two aluminum plates, which are soldered to one another. Cooling ducts, which are closed, when securing the two aluminum plates to one another, are molded between the two soldered aluminum plates. The coolant can then be supplied into the cooling ducts and discharged from them via nozzles. The cooling plates are usually arranged in the housing and the cooling lines are guided to the outside. Extruded sections are also used to some extent. They are also arranged in the housing and are connected to the individual cooling elements by means of heat-conducting paste or heat-conducting foil so as to transfer heat. This solution is described, for example, in US 2018/0026243 A1. Cooling lines are inserted in the housing here and are connected to cross-members in a complex manner.

In the case of the soldered cooling plates as well as in the case of the extruded sections, the cooling line has to disadvantageously be laid in the housing in a complex manner and has to be guided to the outside. At a plurality of connection points, the cooling lines have to in particular be sealed in a complex manner so as to be dust- and moisture-proof. A leakage of the cooling line can lead to a short-circuit in the battery cells and, in an extreme case, even to a fire.

SUMMARY

It is thus the object of the invention to specify an improved or least alternative embodiment for an accumulator arrangement of the generic type, in the case of which the described disadvantages are overcome.

This object is solved according to the invention by means of the subject matter of the independent claim(s). Advantageous embodiments are the subject matter of the dependent claim(s).

An accumulator arrangement is provided for a hybrid or electric vehicle and has a plurality of battery cells, which are stacked in the stacking direction to form at least one battery block. The accumulator arrangement further has a housing comprising a support frame, by means of which the housing is limited towards the outside on four sides. The support frame is thereby formed by at least two longitudinal members and at least two cross members, which are perpendicularly aligned with one another and which form at least one partial interior for the at least one battery block in the support frame. According to the invention, the coolant can flow through at least one of the longitudinal members, and the at least one battery block abuts against at least one of the longitudinal members, through which the coolant can flow, or at least against one of the cross members so as to transfer heat. A length of the support frame further corresponds to a length of the longitudinal member, and connection points of the respective longitudinal member, through which the coolant can flow, are configured on the outside of the support frame.

At the corresponding connection points, the coolant can be supplied into the longitudinal member from the outside and can be discharged and flows through the longitudinal member inside the support frame. The connection points are thereby formed by means of a connection of the respective longitudinal member to further coolant-guiding structures and, according to the invention, abut against the support frame on the outside. The connection points of the respective longitudinal member can advantageously be configured on its longitudinal ends and can open transversely to the longitudinal axis of the respective longitudinal member. The longitudinal ends and thus the connection points are then advantageously arranged in the support frame to as to be open to the outside. The sealing points formed by the connection points are thus located outside of the housing and at a distance from the at least one battery block in the housing. The risk of a short-circuit or even of a fire in the at least one battery block can be minimized or even ruled out in this advantageous way in the case of a leakage of the connection point.

Different embodiments of the support frame are generally conceivable. In the support frame, two longitudinal members and at least two cross members form an outer contour of the support frame, which limits the at least one battery block to the outside on four sides. Depending on the number of the longitudinal members and of the cross members, the individual partial interior as well as a plurality of partial interiors can be formed inside the outer contour. The battery blocks can further be arranged individually, in pairs or in groups in the respective partial interior and can be connected to the support frame so as to transfer heat. If the at least one battery block abuts against the longitudinal member, through which the coolant can flow, inside the partial interior, the heat generated in the battery cells can be dissipated to the coolant in the cross member, through which the coolant flows. If the at least one battery block abuts against the cross member inside the partial interior, the heat generated in the battery cells can be dissipated to the cross member and from the cross member to the coolant in the longitudinal member, through which the coolant flows.

Inside the housing, the coolant can thereby only flow through the at least one longitudinal member in the accumulator arrangement. The longitudinal members, which can be flown through, can advantageously be fluidically connected to form a total cooling duct structure, which can be flown through. Inside the housing, the total cooling duct structure is thereby formed only by the longitudinal members, which can be flown through. In other words, the coolant does not flow through the cross members and also through further parts of the housing—such as, for example, a bottom and a cover of the housing.

It can advantageously be provided that a cooling plate is in each case stacked between the respective battery cells. The adjacent battery cells then abut against the respective cooling plate so as to transfer heat. The cooling plates then have an L-shaped or T-shaped abutment flange at least on one side. From the battery cells in the battery block, the abutment flange protrudes to the outside. The at least one battery block comprising the abutment flanges of the cooling plates further abuts against at least one of the longitudinal members, through which the coolant can flow, or at least against one of the cross members so as to transfer heat. If the abutment flanges of the cooling plates protrude from the battery block on one side, the battery block can abut against one of the adjacent longitudinal members or against one of the adjacent cross members so as to transfer heat. If the abutment flanges of the cooling plates protrude from the battery block on both sides, the battery block can abut against the respective adjacent longitudinal member on both sides or against the respective adjacent cross member so as to transfer heat.

If the at least one battery block abuts against the longitudinal member, which can be flown through, at least on one side, the heat generated in the battery cells can be dissipated via the cooling plates to the coolant in the longitudinal member, through which the coolant flows. If the at least one battery block abuts against the cross member at least on one side, the heat generated in the battery cells can be dissipated via the cooling plates to the cross member and from the cross member to the coolant into the longitudinal member, through which the coolant flows. The battery cells in the at least one battery block can be cooled efficiently in this way. It can additionally be provided that a heat-conducting coating is arranged between the respective abutment flange and at least one of the longitudinal members or at least one of the cross members. The heat-conducting coating is preferably a heat-conducting paste or a heat-conducting foil, and can intensify the heat transfer between the cooling plates and at least one of the longitudinal members or at least one of the cross members.

In the case of an advantageous further development of the accumulator arrangement, it is provided that the respective longitudinal members and/or the respective cross members are formed from a heat-conducting material. The respective longitudinal members and the respective cross members are preferably connected to one another so as to transfer heat. The respective longitudinal members and/or the respective cross members can thus be formed, for example, from metal. If the battery blocks abut against the longitudinal member, through which the coolant can flow, so as to transfer heat, only the longitudinal members can be formed from a heat-conducting material. If the battery blocks abut against the cross member so as to transfer heat, the longitudinal members and the cross members can then be formed from a heat-conducting material and can be connected to one another so as to transfer heat. Alternatively, the respective longitudinal members and/or the respective cross members can each be metallic extruded sections, which are formed by means of extrusion molding, which are preferably connected to one another so as to transfer heat. If the battery blocks abut against the longitudinal member, through which the coolant can flow, so as to transfer heat, only the longitudinal members can be formed as extruded sections. If the battery blocks comprising the cooling plates abut against the cross member so as to transfer heat, the longitudinal members and the cross members can then be formed as extruded sections and can be connected to one another so as to transfer heat.

The respective longitudinal members and the respective cross members can advantageously be secured to one another by means of a substance-to-substance bond or in a form-fitting manner to form the support frame. The respective longitudinal members are preferably mechanically connected to the respective cross members by means of welding or soldering or by means of screwing or riveting. In the alternative, the cross member can in each case have, on both sides, a securing flange and a support region connecting the securing flanges and can be secured to the respective adjacent longitudinal members by means of a substance-to-substance bond or in a form-fitting manner by means of the securing flanges. The respective cross member is preferably mechanically connected to the respective longitudinal member by means of welding or soldering or by means of screwing or riveting. Alternatively, a guide rail, into which the cross member is inserted and is thus fastened to the respective longitudinal member, can be configured on or secured to the respective longitudinal member. In addition, the respective cross member can be mechanically connected to the respective guide rail by means of welding or soldering or by means of screwing or riveting.

In the case of an advantageous embodiment of the accumulator arrangement, it is provided that at least some of the respective longitudinal members each have at least one cooling duct, through which the coolant can flow. The respective cooling ducts are then fluidically connected to form a total cooling duct structure in the longitudinal member or in the support frame. Alternatively to this embodiment, it can be provided that at least some of the respective longitudinal members each have at least a first cooling duct, through which the coolant can flow in a first flow direction, and each at least a second cooling duct, through which the coolant can flow in a second flow direction opposite the first flow direction. The first cooling ducts and the second cooling ducts are then fluidically connected to form a total cooling duct structure in the longitudinal member or in the support frame. Independently of the above-described embodiments, it can additionally be provided that a fluid distributor for distributing the coolant in the total cooling duct structure and/or a fluid collector for collecting the coolant from the total cooling duct structure and/or a fluid deflector for deflecting the coolant in the total cooling duct structure are secured to at least one of the longitudinal members, through which the coolant can flow, by means of a substance-to-substance bond or in a form-fitting manner. They are preferably connected to at least one of the longitudinal members, through which the coolant can flow, by means of welding or soldering or by means of screwing or riveting. Advantageously, the total cooling duct structure can be designed differently and can be adapted to the required cooling capacity. Inside the housing, the total cooling duct structure is thereby formed exclusively by the longitudinal members, which can be flown through. In other words, the coolant cannot flow through the cross members and also through further parts of the housing—such as, for example, a bottom and a cover of the housing—and are not fluidically integrated into the total cooling duct structure.

It can advantageously be provided that the support frame has a reinforcing flange at least on one side and at least area by area. The reinforcing flange is thereby angled on at least one of the respective longitudinal members and/or on at least one cross member on one side or on both sides. The support frame can be additionally reinforced by means of the reinforcing flange. It can also advantageously be provided that the housing has a bottom and/or a cover. The bottom as well as the cover can close the support frame of the housing and thus the at least one partial interior comprising the at least one battery block. The bottom as well as the cover can be secured to the respective reinforcing flange of the support frame in a form-fitting manner at least circumferentially on the outside. The bottom as well as the cover are preferably fastened to the support frame by means of screwing or riveting.

In the case of a further development of the accumulator arrangement, it is provided that the at least one battery block is secured to at least one of the longitudinal members and/or to at least one of the cross members. Alternatively or additionally, the at least one battery block can be secured to the cover or to the bottom. The at least one battery block is preferably screwed thereto. A shifting of the battery block inside the partial interior can be prevented thereby, and the heat-transferring contact between the at least one battery block and the respective longitudinal member or the respective cross member can further be secured.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
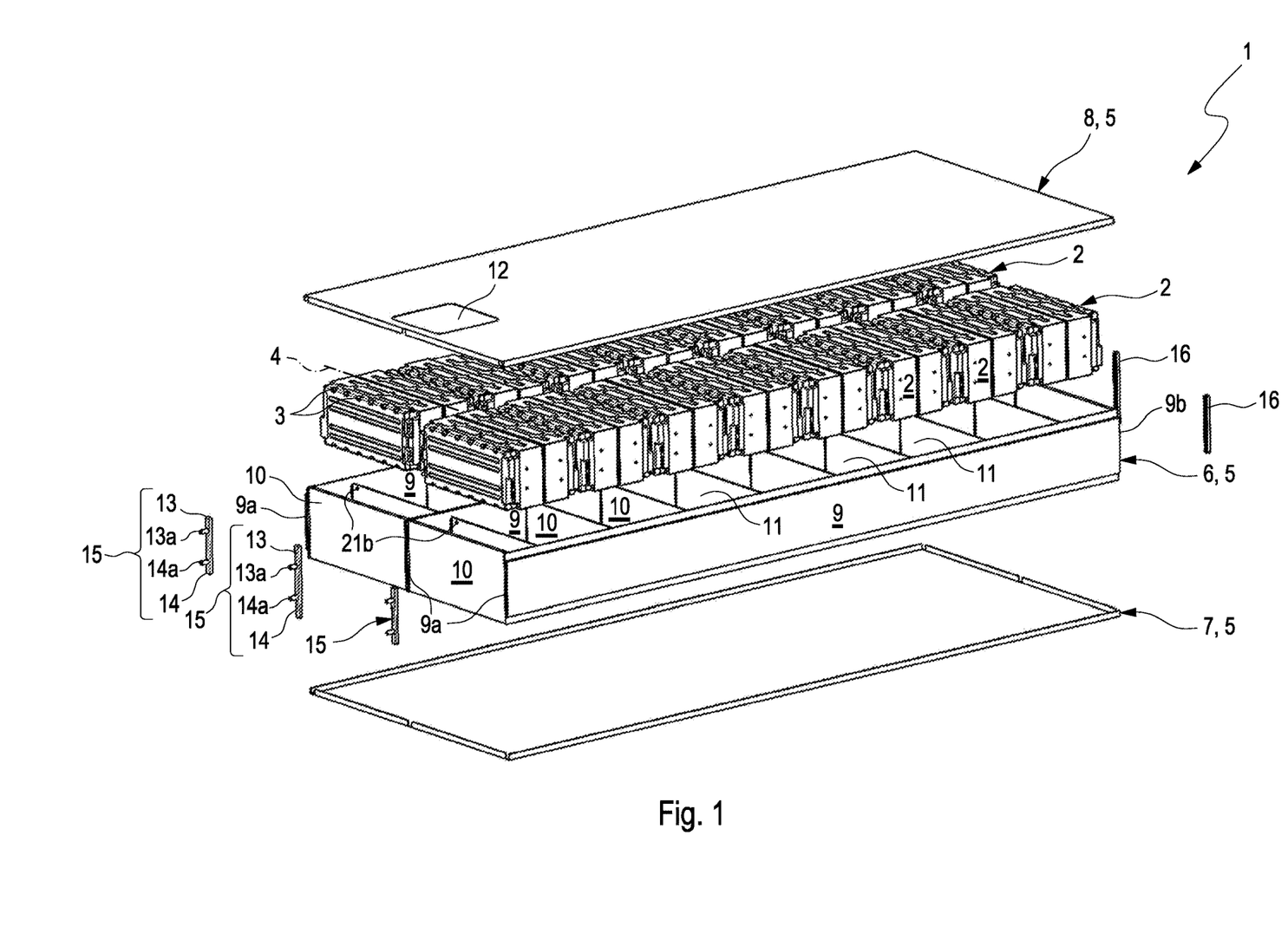
FIG. 1 shows an exploded view of an accumulator arrangement according to the invention in a first embodiment.
Figure 2:
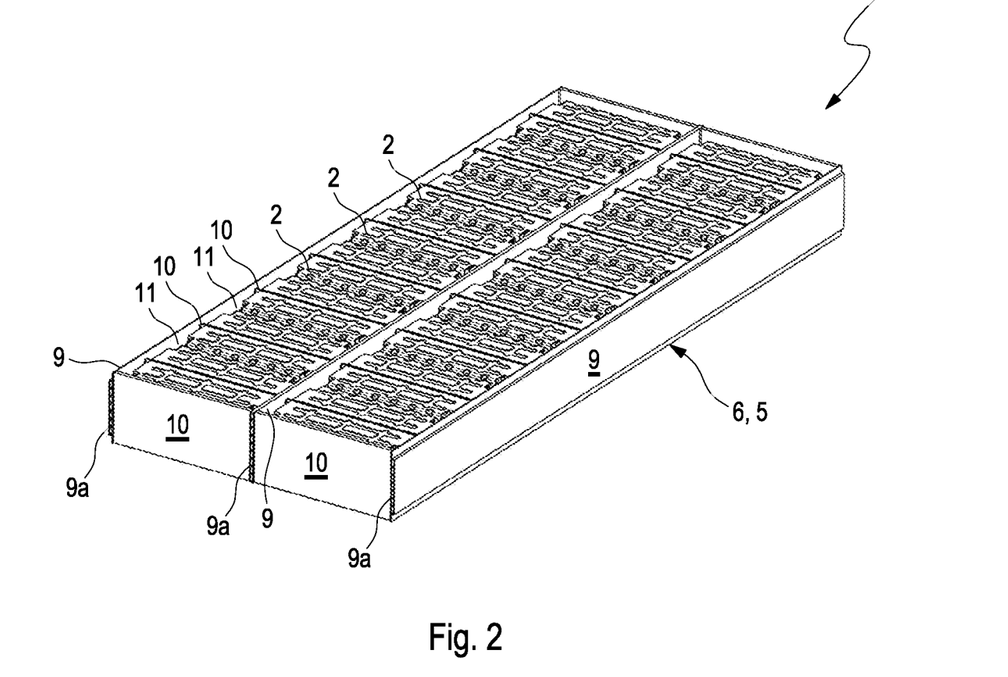
FIGS. 2 and 3 show a view and a top view onto the opened accumulator arrangement in the first embodiment.
Figure 3:
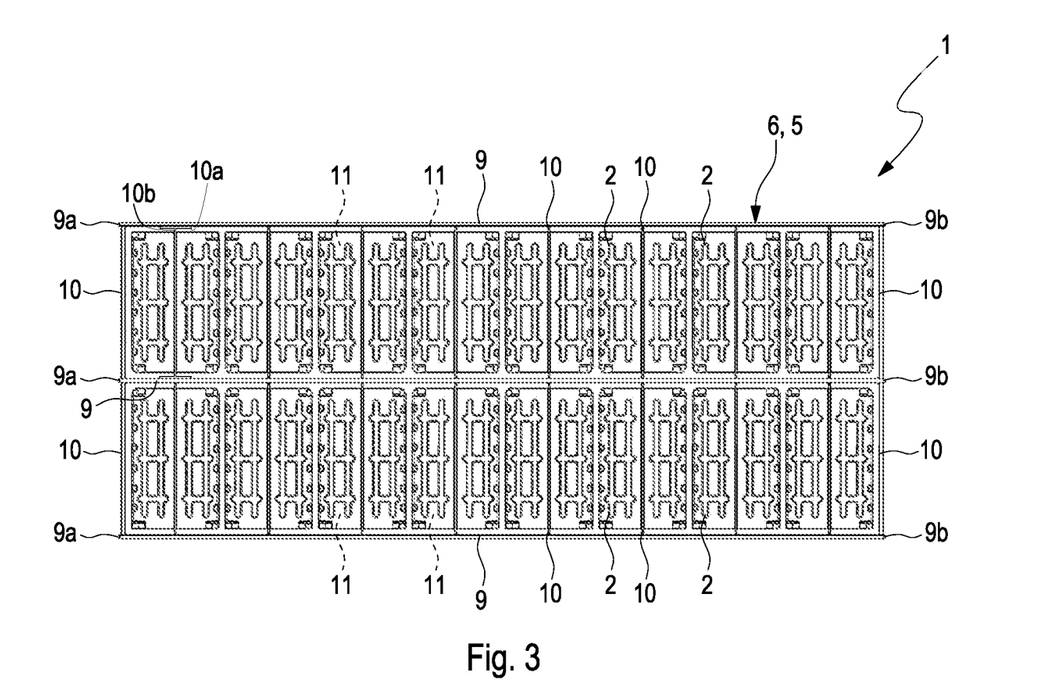

FIG. 1 to FIG. 6 show an accumulator arrangement 1 according to the invention comprising a plurality of battery blocks 2 for a hybrid or electric vehicle in a first embodiment. FIG. 1 shows an exploded view of the accumulator arrangement 1. FIG. 2 and FIG. 3 show the opened accumulator arrangement 1. With reference to FIG. 1 to FIG. 3, the battery blocks 2 of the accumulator arrangement 1 are made up of a plurality of individual battery cells 3, which are stacked against one another in the stacking direction 4. The battery blocks 2 are arranged in a housing 5 of the accumulator arrangement 1, whereby the housing 5 comprises a support frame 6, a bottom 7, and a cover 8. The support frame 6 is thereby made up of a plurality of longitudinal members 9 and of a plurality of cross members 10. Two longitudinal members 9 located on the outside and four cross members 10 located on the outside thereby limit the support frame 6 to the outside. The longitudinal members 9 located on the outside are configured so as to differ from the longitudinal member 9 located on the inside, and the cross members 10 located on the outside are configured so as to differ from the cross members 10 located on the inside. The cross members 10 located on the outside are thus higher, so as to be able to tightly close the housing 5 by means of the bottom 7 and by means of the cover 8. Deviating from the longitudinal members 9 located on the inside, the longitudinal members 9 located on the outside have an edge on both sides for securing the bottom 7 and the cover 8.

A length of the support frame 6 and thus of the housing 5 is specified by means of a length of the longitudinal members 9. The longitudinal members 9 and the cross members 10 are perpendicularly aligned to one another and form a plurality of partial interiors 11 for the battery blocks 2. The battery blocks 2 are arranged individually or in pairs in the partial interiors 11. The bottom 7 and the cover 8 close the individual partial interiors 11, so that the battery blocks 2 are protected on all sides by the housing 5. A line opening 12, through which the electrical lines can guided into the housing 5, is provided in the cover 8.

The coolant, which flows from a first longitudinal end 9a of the respective longitudinal support 9 to its second longitudinal end 9b and back, can flow through the longitudinal members 9. Details relating to the setup of the longitudinal members 9 will be described in more detail below on the basis of FIG. 5 and FIG. 6. To connect the respective longitudinal member 9, a fluid distributor 13 and a fluid collector 14, which are configured in a joint nozzle part 15, are provided on the first longitudinal end 9a of said longitudinal member. The fluid distributor 13 thereby has a distributor nozzle 13a, and the fluid collector 14 has a collector nozzle 14a, to which external coolant-guiding cooling lines can be connected. A fluid deflector 16 for deflecting the coolant in the respective longitudinal member 9 is secured to the second longitudinal end 9b of the respective longitudinal member 9. As a whole, one nozzle part 15 each and one fluid deflector 16 each are provided in the accumulator arrangement for each of the longitudinal members 9. The nozzle part 15 and the fluid deflector 16 are secured to the respective longitudinal member 9 by means of a substance-to-substance bond, preferably by means of welding or soldering. The respective longitudinal member 9 is fluidically connected to the nozzle part 15 and to the deflector part 16 outside of the housing 5, so that connection points of the respective longitudinal member 9 are configured on the outside of the support frame 6. No sealing points are thus present inside the housing 5. The risk of a short-circuit or even of a fire in the battery cells 3 in the case of a leakage can thus be minimized or even ruled out.

Figure 8A:
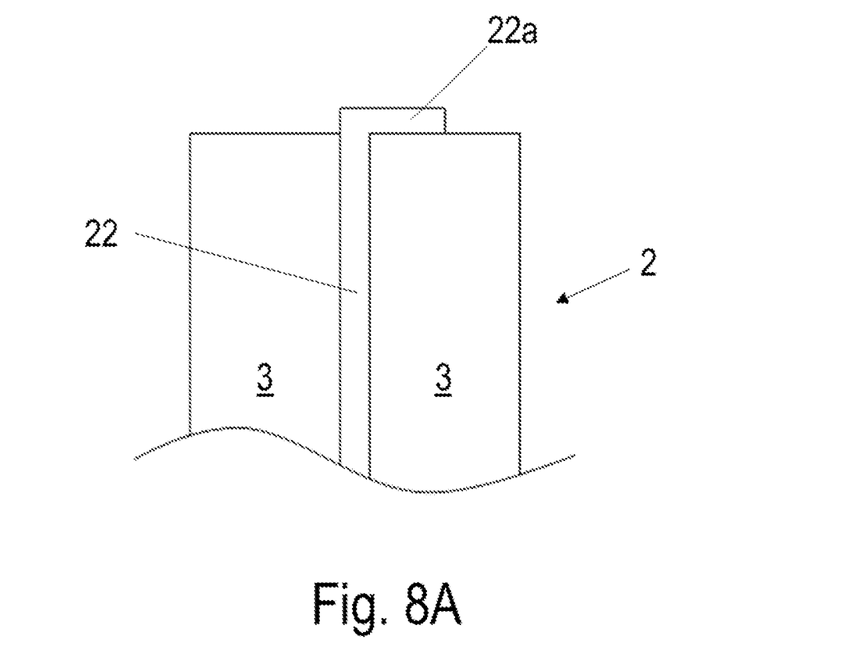
FIG. 8A shows a cooling plate having an L-shaped abutment flange disposed between two battery cells.
Figure 8B:
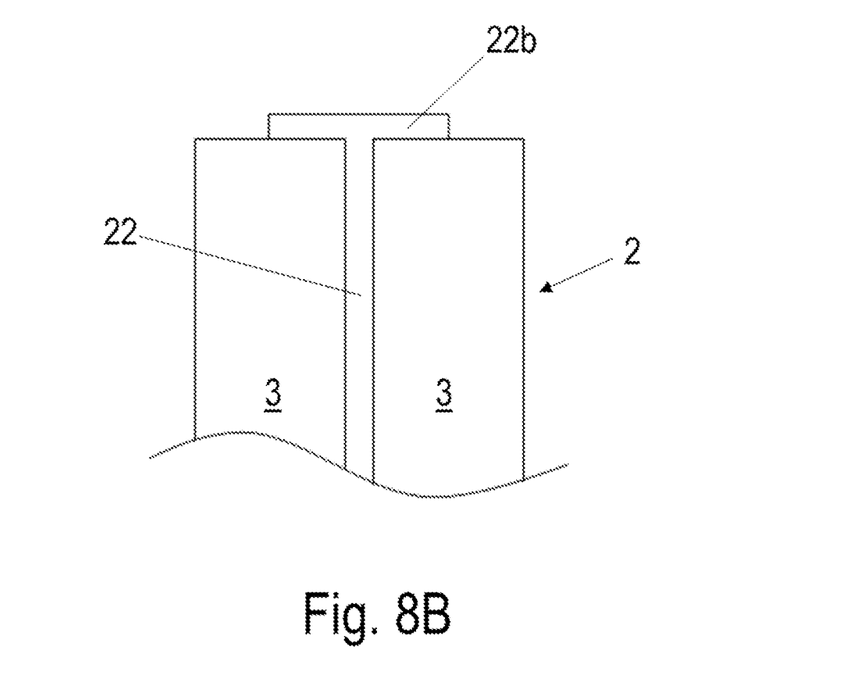
FIG. 8B shows a cooling plate having a T-shaped abutment flange disposed between two battery cells.

The individual battery blocks 2 are arranged individually or in pairs in the partial interiors 11 and are secured to the respective adjacent cross members 10 so as to transfer heat. In this exemplary embodiment, the cross members 10, including the securing flanges 10a and the support region 10b, are formed from metal and the longitudinal members 9 are metallic extruded sections. The cross members 10 and the longitudinal members 9 are welded to one another here and are thus connected to one another so as to transfer heat. The heat generated in the battery cells 3 can thus be discharged to the cross members 10 and via the latter to the coolant in the respective longitudinal member 9. Adjacent battery cells 3 may abut against a respective cooling plate 22 so as to transfer heat. A cooling plate 22 may have an L-shaped abutment flange 22a (see, e.g., FIG. 8A) or a T-shaped abutment flange 22b (see, e.g., FIG. 8B).

Figure 4:
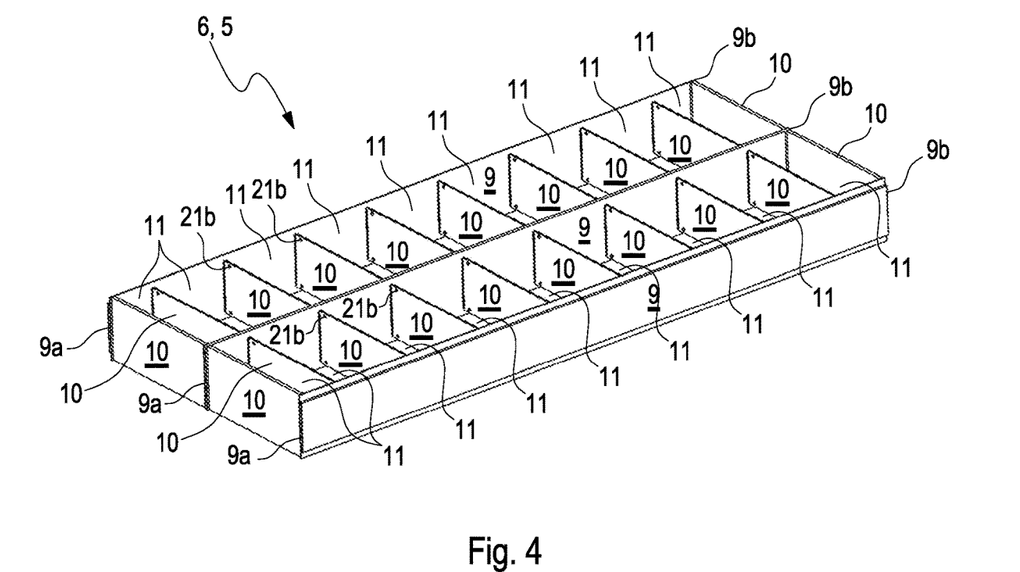
FIGS. 4 and 5 show views of a support frame of the accumulator arrangement in the first embodiment.
Figure 5:
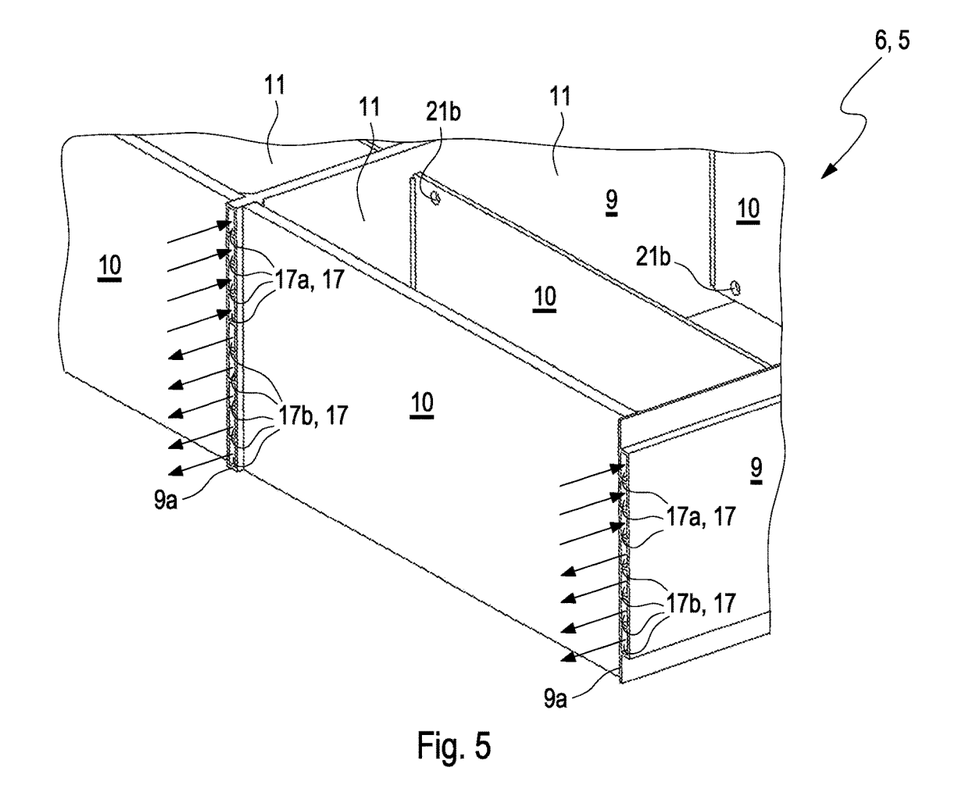

FIG. 4 and FIG. 5 now show views of the support frame 6 of the accumulator arrangement 1 in the first embodiment. It is visible in FIG. 5 that the respective longitudinal members 9 have a plurality of first cooling ducts 17a and a plurality of second cooling ducts 17b. The longitudinal members 9 located on the outside are configured so as to differ from the longitudinal member 9 located on the inside, whereby the two outer cooling ducts 17a and 17b in the longitudinal members 9 located on the outside have been replaced by an edge for securing the bottom 7 and the cover 8. The coolant flows through the first cooling ducts 17a from the fluid distributor 13 to the fluid deflector 16 and is deflected in the latter from the first cooling ducts 17a into the second cooling ducts 17b. The coolant then flows through the second cooling ducts 17b to the fluid collector 14. For the sake of clarity, the fluid distributor 13, the fluid collector 14, and the fluid deflector 16 are not shown here. The flow direction in the first cooling ducts 17a is thereby opposite to the flow direction in the second cooling ducts 17b, as suggested by means of arrows here. The cooling ducts 17a and 17b in the respective longitudinal members 9 each form a total cooling duct structure 17.

Figure 6:
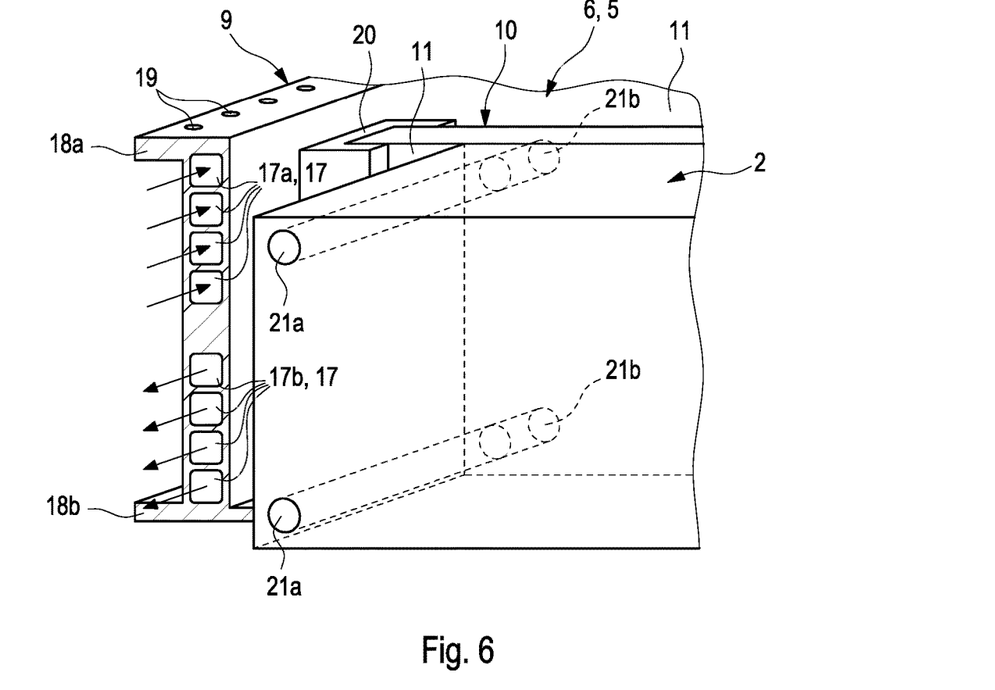
FIG. 6 shows a partial view of a battery block in the accumulator arrangement in the first embodiment.

FIG. 6 shows a partial view of the battery block 2 in the accumulator arrangement 1 in the first embodiment. Deviating from FIG. 1 to FIG. 5, the longitudinal member 9 has a one-sided reinforcing flange 18a and a two-sided reinforcing flange 18b, which faces the bottom 7. A plurality of screw openings 19 for securing the bottom 7 and the cover 8 are molded on the reinforcing flanges 18a and 18b—here only visible on the reinforcing flange 18a. The support frame 6 is additionally reinforced by means of the reinforcing flanges 18a and 18b. Deviating from FIG. 1 to FIG. 5, the cross member 10 is further secured to the respective longitudinal member 9 in a guide rail 20. Advantageously, the guide rail 20 is formed from a heat-conducting material, and the cross member 10 is secured to the longitudinal member 9 via the guide rail 20 so as to transfer heat. It is further visible here that the battery block 2 can be screwed to the cross member 10 through of a securing opening 21a in the battery block 2 and a securing opening 21b in the cross member 10, and can thus be secured thereto so as to transfer heat. The securing openings 21b in the cross members 10 are also visible in FIG. 1, FIG. 4, and FIG. 5.

Figure 7:
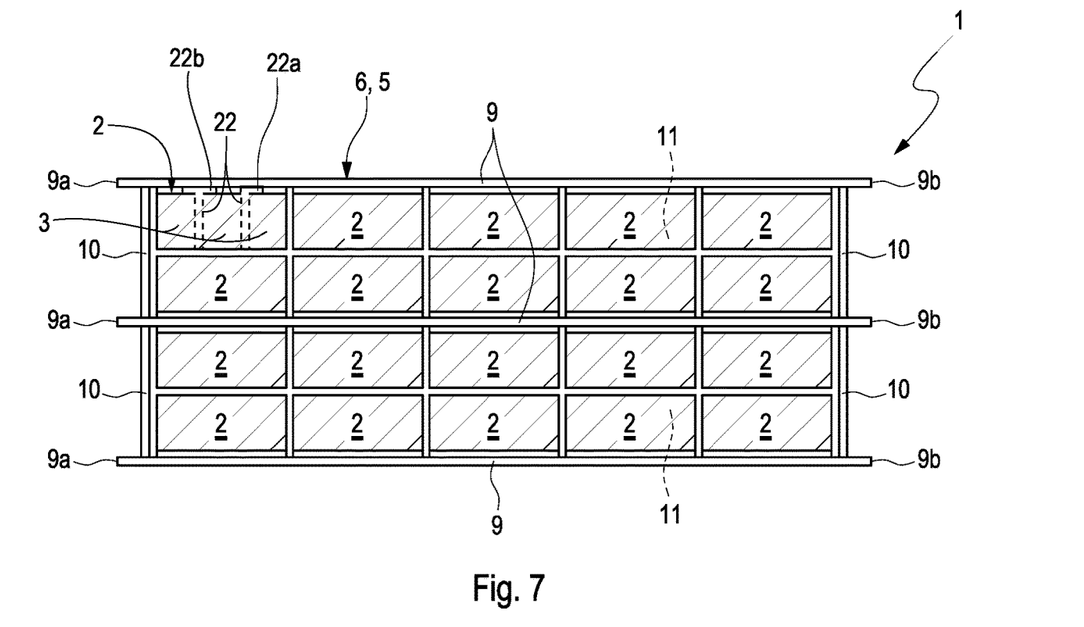
FIG. 7 shows a top view onto an opened accumulator arrangement in a second embodiment.

FIG. 7 shows a top view onto the opened accumulator arrangement 1 in a second embodiment. Two partial interiors 11, in which the battery blocks 2 are arranged, are formed here between the respective longitudinal members 9 and the respective cross members 10. Deviating from the first embodiment, the individual battery blocks 2 are secured to the longitudinal members 9 so as to transfer heat. Apart from that, the accumulator arrangement 1 shown here corresponds to the accumulator arrangement 1 in FIG. 1 to FIG. 6.

The invention claimed is:

1. An accumulator arrangement for a hybrid or electric vehicle, comprising:
   a plurality of battery cells stacked in a stacking direction to form at least one battery block;
   a housing including a support frame limiting the housing towards an outside on four sides;
   the support frame including at least two longitudinal members and at least two cross members perpendicularly aligned with one another defining at least one partial interior in the support frame for the at least one battery block;
   wherein at least one longitudinal member of the at least two longitudinal members is configured to conduct a coolant, and the at least one battery block abuts against at least one of (i) the at least one longitudinal member and (ii) at least one of the at least two cross members to transfer heat;
   wherein a length of the support frame corresponds to a length of the at least one longitudinal member;
   wherein a plurality of connection points of the at least one longitudinal member, through which the coolant is flowable, are configured on an outside of the support frame; and
   wherein at least one cross member of the at least two cross members has, on both sides, a securing flange of a plurality of securing flanges and a support region connecting the plurality of securing flanges, the at least one cross member secured via the plurality of securing flanges to a respective adjacent longitudinal member of the at least two longitudinal members at least one of (i) via a substance-to-substance bond and (ii) in a form-fitting manner.

2. The accumulator arrangement according to claim 1, further comprising a plurality of cooling plates, wherein:
   a cooling plate of the plurality of cooling plates is stacked between each pair of adjacent battery cells of the plurality of battery cells and abuts against the pair of adjacent battery cells to transfer heat;
   the plurality of cooling plates respectively include, on at least one side transverse to the stacking direction, an abutment flange of a plurality of abutment flanges, each of the plurality of abutment flanges having one of a L-shape and a T-shape, the plurality of abutment flanges protruding toward an outside from the plurality of battery cells in the at least one battery block; and
   the at least one battery block at least on one side abuts with the plurality of abutment flanges of the plurality of cooling plates against one of (i) the at least one longitudinal member and (ii) one of the at least two cross members to transfer heat.

3. The accumulator arrangement according to claim 2, further comprising a heat-conducting coating arranged between the plurality of abutment flanges and one of at least one of the at least two longitudinal members and at least one of the at least two cross members.

4. The accumulator arrangement according to claim 1, wherein:
   at least one of the at least two longitudinal members and the at least two cross members are at least one of (i) composed of a heat-conducting material and (ii) structured as extrusion molded metallic sections; and
   the at least two longitudinal members and the at least two cross members are connected to one another to transfer heat.

5. The accumulator arrangement according to claim 1, wherein at least some longitudinal members of the at least two longitudinal members respectively include at least one cooling duct through which the coolant is flowable, the at least one cooling duct of the at least some longitudinal members fluidically connected to one another to define a total cooling duct structure in at least one of (i) a respective longitudinal member of the at least some longitudinal members and (ii) the support frame.

6. The accumulator arrangement according to claim 5, further comprising at least one of (i) a fluid distributor for distributing the coolant in the total cooling duct structure, (ii) a fluid collector for collecting the coolant from the total cooling duct structure, and (iii) a fluid deflector for deflecting the coolant in the total cooling duct structure, is secured to at least one of the at least two longitudinal members via at least one of a substance-to-substance bond and a form-fitting manner.

7. The accumulator arrangement according to claim 1, wherein the support frame includes a reinforcing flange extending at least partially along at least one longitudinal side, the reinforcing flange protruding at a transverse angle from at least one of (i) at least one of the at least two longitudinal members and (ii) at least one of the at least two cross members, on one side or both sides.

8. The accumulator arrangement according to claim 1, wherein the housing has at least one of a bottom and a cover which closes the support frame of the housing and the at least one partial interior in which the at least one battery block is arranged.

9. The accumulator arrangement according to claim 7, wherein:
   the housing has at least one of a bottom and a cover which closes the support frame of the housing and the at least one partial interior in which the at least one battery block is arranged; and
   the at least one of the bottom and the cover is secured to the reinforcing flange of the support frame in a form-fitting manner at least circumferentially on an outside.

10. The accumulator arrangement according to claim 8, wherein the at least one battery block is secured to at least one of (i) at least one of the at least two longitudinal members, (ii) at least one of the at least two cross members, and (iii) the at least one of the bottom and the cover.

11. The accumulator arrangement according to claim 1, wherein the at least two longitudinal members and the at least two cross members are secured to one another one of (i) via one of a substance-to-substance bond and (ii) in a form-fitting manner, to form the support frame.

12. The accumulator arrangement according to claim 1, further comprising a guide rail connected to one of the at least two longitudinal members, wherein one of the at least two cross members is arranged within the guide rail.

13. The accumulator arrangement according to claim 1, wherein:
   at least some longitudinal members of the plurality of longitudinal members respectively include a first cooling duct through which the coolant is flowable in a first flow direction and a second cooling duct through which the coolant is flowable in a second flow direction opposite the first flow direction; and
   the first cooling duct and the second cooling duct are fluidically connected to form a total cooling duct structure in at least one of (i) a respective longitudinal member of the at least some longitudinal members and (ii) the support frame.

14. The accumulator arrangement according to claim 3, wherein the heat-conducting coating is one of a heat-conducting paste and a heat-conducting foil.

15. The accumulator arrangement according to claim 1, wherein:
   the at least two longitudinal members respectively include:
   a first longitudinal end;
   a second longitudinal end opposite the first longitudinal end;
   a plurality of cooling ducts including at least one first cooling duct and at least one second cooling duct;
   a joint nozzle part connected to the first longitudinal end and in fluid communication with the plurality of cooling ducts; and
   a fluid deflector connected to the second longitudinal end;
   the joint nozzle part includes:
   a fluid distributor connected to and in fluid communication with the at least one first cooling duct such that the coolant is distributable to the at least one first cooling duct via the fluid distributor; and
   a fluid collector connected to and in fluid communication with the at least one second cooling duct such that the coolant is collectable from the at least one second cooling duct via the fluid collector;
   the fluid deflector is connected to and in fluid communication with the at least one first cooling duct and the at least one second cooling duct, the fluid deflector configured to receive the coolant from the at least one first cooling duct and deflect the coolant into the at least one second cooling duct.

16. The accumulator arrangement according to claim 15, wherein the joint nozzle part and the fluid deflector are structured as separate individual components from the respective longitudinal member and are disposed outside of the support frame.

17. The accumulator arrangement according to claim 15, wherein the coolant is flowable within the housing exclusively via the plurality of cooling ducts of the at least two longitudinal members.

18. An accumulator arrangement for a hybrid or electric vehicle, comprising:
   a housing including a support frame limiting the housing towards an outside on four sides, a cover, and a bottom;
   at least one blocked block defined by a plurality of battery cells stacked in a stacking direction;
   the support frame including a plurality of longitudinal members and a plurality of cross members perpendicularly aligned with one another defining at least one partial interior in the support frame, the at least one battery block arranged in the at least one partial interior;
   at least one longitudinal member of the plurality of longitudinal members is configured to conduct a coolant;
   the at least one longitudinal member including a plurality of connection points through which the coolant is flowable at least one of into and out of the at least one longitudinal member, the plurality of connection points configured on an outside of the support frame;
   wherein, to transfer heat, the at least one battery block abuts against at least one of (i) the at least one longitudinal member and (ii) at least one of the plurality of cross members;
   wherein a length of the support frame corresponds to a length of the at least one longitudinal member; and
   wherein the at least one battery block includes a first securing opening, the plurality of cross members each include a second securing opening, and a plurality of screws engage a respective pair of aligned first and second securing openings securing the at least one battery block and the plurality of cross members together.

19. The accumulator arrangement according to claim 18, further comprising a plurality of cooling plates, wherein a cooling plate of the plurality of cooling plates is stacked between each pair of adjacent battery cells of the plurality of battery cells and abuts against the pair of adjacent battery cells to transfer heat.

20. An accumulator arrangement for a hybrid or electric vehicle, comprising:

a housing including a support frame limiting the housing towards an outside on four sides, a cover, and a bottom;

at least one block defined by a plurality of battery cells stacked in a stacking direction;

the support frame including a plurality of longitudinal members and a plurality of cross members perpendicularly aligned with one another defining at least one partial interior in the support frame, the at least one battery block arranged in the at least one partial interior;

at least one longitudinal member of the plurality of longitudinal members is configured to conduct a coolant;

the at least one longitudinal member including a plurality of connection points through which the coolant is flowable at least one of into and out of the at least one longitudinal member, the plurality of connection points configured on an outside of the support frame;

wherein, to transfer heat, the at least one battery block abuts against at least one of (i) the at least one longitudinal member and (ii) at least one of the plurality of cross members;

wherein a length of the support frame corresponds to a length of the at least one longitudinal member;

wherein at least one of the plurality of longitudinal members and the plurality of cross members includes a reinforcing flange projecting outward from an end thereof; and wherein the reinforcing flange includes a plurality of screw openings via which a plurality of screws engage one of the cover and the bottom and secure the support frame to the one of the cover and the bottom.

* * * * *